(12) United States Patent
Chamberlain et al.

(10) Patent No.: US 8,914,717 B2
(45) Date of Patent: Dec. 16, 2014

(54) DYNAMIC THRESHOLDS FOR CONDITIONAL FORMATS

(75) Inventors: Benjamin C. Chamberlain, Redmond, WA (US); Bruce Cordell Jones, Bellevue, WA (US); Christopher M. Street, Redmond, WA (US); Eric B. Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/794,876

(22) Filed: Jun. 7, 2010

(65) Prior Publication Data
US 2010/0251090 A1 Sep. 30, 2010

Related U.S. Application Data (63) Continuation of application No. 11/364,377, filed on Feb. 27, 2006, now Pat. No. 7,770,100.

(51) Int. Cl.
*G06F 17/21* (2006.01)
*G06F 17/24* (2006.01)

(52) U.S. Cl.
CPC ............ *G06F 17/246* (2013.01); *G06F 17/211* (2013.01)
USPC ............................ 715/212; 715/215; 715/217

(58) Field of Classification Search
USPC .......................................... 715/212, 215, 217
See application file for complete search history.

(56) References Cited

U.S. PATENT DOCUMENTS

| | | | |
|---|---|---|---|
| 5,093,907 A * | 3/1992 | Hwong et al. | 345/473 |
| 5,247,611 A | 9/1993 | Norden-Paul | |
| 5,255,363 A | 10/1993 | Seyler | |
| 5,381,517 A | 1/1995 | Thorndike | |
| 5,455,903 A * | 10/1995 | Jolissaint et al. | 715/835 |
| 5,485,618 A * | 1/1996 | Smith | 715/710 |
| 5,566,291 A | 10/1996 | Boulton | |
| 5,566,330 A | 10/1996 | Sheffield | |
| 5,598,519 A | 1/1997 | Narayanan | |
| 5,604,854 A | 2/1997 | Glassey | |
| 5,632,009 A * | 5/1997 | Rao et al. | 715/201 |
| 5,787,411 A | 7/1998 | Groff et al. | |

(Continued)

FOREIGN PATENT DOCUMENTS

| | | |
|---|---|---|
| JP | 10-040050 | 2/1998 |
| JP | 2001-067486 | 6/2001 |

(Continued)

OTHER PUBLICATIONS

Person; Special Edition Using Microsoft Excel 97; Dec. 17, 2006; Que Publishing; renumbered pp. 1-37.*

(Continued)

*Primary Examiner* — Andrew Dyer
(74) *Attorney, Agent, or Firm* — Damon Rieth; Jim Ross; Micky Minhas (57) ABSTRACT

Generally described, embodiments of the present invention provide the ability to utilize dynamic thresholds and dynamic threshold values when generating variable formatting rules to be applied to a range of cells. Dynamic thresholds include, but are not limited to, "Highest Value," "Middle Value," "Lowest Value," "Number," "Percent," "Percentile," and "Formula." When using a dynamic threshold, dynamic threshold values are determined based on values contained in a selected range of cells.

20 Claims, 8 Drawing Sheets

(56) References Cited

U.S. PATENT DOCUMENTS

| | | |
|---|---|---|
| 5,883,635 A | 3/1999 | Rao |
| 5,966,716 A | 10/1999 | Comer et al. |
| 6,026,397 A | 2/2000 | Sheppard |
| 6,078,924 A | 6/2000 | Ainsbury et al. |
| 6,085,202 A | 7/2000 | Rao |
| 6,185,582 B1 | 2/2001 | Zellweger |
| 6,205,675 B1 | 3/2001 | Ide |
| 6,246,410 B1 | 6/2001 | Bergeron et al. |
| 6,279,016 B1 | 8/2001 | De Vorchik et al. |
| 6,349,315 B1 | 2/2002 | Sonoyama |
| 6,411,313 B1 | 6/2002 | Conlon et al. |
| 6,453,270 B1 | 9/2002 | Durbin |
| 6,496,832 B2 | 12/2002 | Chi |
| 6,507,836 B1 | 1/2003 | Nose et al. |
| 6,535,883 B1 | 3/2003 | Lee et al. |
| 6,549,894 B1 | 4/2003 | Simpson et al. |
| 6,604,095 B1 | 8/2003 | Cesare et al. |
| 6,626,959 B1 | 9/2003 | Moise et al. |
| 6,659,626 B1 | 12/2003 | Markey |
| 6,757,867 B2 | 6/2004 | Bauchot |
| 6,829,615 B2 | 12/2004 | Schirmer et al. |
| 6,839,719 B2 | 1/2005 | Wallace |
| 6,854,103 B2 | 2/2005 | Teene |
| 6,867,788 B1 | 3/2005 | Takeda |
| 6,906,717 B2 | 6/2005 | Couckuyt |
| 6,988,241 B1 | 1/2006 | Guttman et al. |
| 7,073,133 B2 | 7/2006 | Hughes et al. |
| 7,130,812 B1 | 10/2006 | Iyer et al. |
| 7,143,339 B2 | 11/2006 | Weinberg et al. |
| 7,188,169 B2 | 3/2007 | Buus et al. |
| 7,363,306 B1 | 4/2008 | Hao |
| 7,370,047 B2 | 5/2008 | Gorman |
| 7,480,675 B2 | 1/2009 | Folting et al. |
| 7,627,812 B2 | 12/2009 | Chamberlain |
| 7,657,552 B2 | 2/2010 | Welker |
| 7,770,100 B2 | 8/2010 | Chamberlain et al. |
| 7,831,539 B2 | 11/2010 | Folting et al. |
| 8,095,866 B2 | 1/2012 | Folting et al. |
| 8,286,072 B2 | 10/2012 | Chamberlain et al. |
| 8,601,383 B2 | 12/2013 | Folting et al. |
| 2002/0010713 A1 | 1/2002 | Egilsson |
| 2002/0013786 A1 | 1/2002 | Machalek |
| 2002/0038217 A1 | 3/2002 | Young |
| 2002/0049687 A1 | 4/2002 | Helsper et al. |
| 2002/0054141 A1 | 5/2002 | Yen et al. |
| 2002/0059233 A1 | 5/2002 | Bauchot |
| 2002/0078086 A1 | 6/2002 | Alden |
| 2002/0116417 A1 | 8/2002 | Weinberg et al. |
| 2002/0120604 A1 | 8/2002 | Labarge et al. |
| 2003/0030672 A1 | 2/2003 | Hughes et al. |
| 2003/0225876 A1 | 12/2003 | Oliver |
| 2004/0002827 A1 | 1/2004 | Iguchi |
| 2004/0060001 A1 | 3/2004 | Coffen |
| 2004/0117731 A1 | 6/2004 | Blyashov |
| 2004/0181507 A1 | 9/2004 | Megiddo |
| 2004/0205450 A1 | 10/2004 | Hao |
| 2004/0268237 A1 | 12/2004 | Jones et al. |
| 2005/0039033 A1 | 2/2005 | Meyers et al. |
| 2005/0071737 A1 | 3/2005 | Adendorff et al. |
| 2005/0089223 A1 | 4/2005 | Krumm |
| 2005/0125377 A1 | 6/2005 | Kotler |
| 2005/0154769 A1 | 7/2005 | Eckart |
| 2005/0192825 A1 | 9/2005 | Cardno et al. |
| 2005/0210001 A1 | 9/2005 | Lee |
| 2005/0216831 A1 | 9/2005 | Guzik et al. |
| 2006/0002608 A1 | 1/2006 | Haddon et al. |
| 2006/0013455 A1 | 1/2006 | Watson et al. |
| 2006/0074866 A1 | 4/2006 | Chamberlain |
| 2006/0075328 A1 | 4/2006 | Becker et al. |
| 2006/0095276 A1 | 5/2006 | Axelrod et al. |
| 2006/0136808 A1 | 6/2006 | Chirilov |
| 2006/0167704 A1 | 7/2006 | Nicholls |
| 2006/0224568 A1 | 10/2006 | Debrito |
| 2006/0287998 A1 | 12/2006 | Folting et al. |
| 2007/0061369 A1 | 3/2007 | Folting et al. |
| 2007/0061746 A1 | 3/2007 | Folting et al. |
| 2007/0074130 A1 | 3/2007 | Folting et al. |
| 2007/0101252 A1 | 5/2007 | Chamberlain |
| 2007/0174228 A1 | 7/2007 | Folting et al. |
| 2007/0204212 A1 | 8/2007 | Chamberlain et al. |
| 2010/0042913 A1 | 2/2010 | Chamberlain et al. |
| 2012/0079363 A1 | 3/2012 | Folting et al. |
| 2012/0324328 A1 | 12/2012 | Chamberlain et al. |

FOREIGN PATENT DOCUMENTS

| | | |
|---|---|---|
| JP | 11-282941 | 6/2004 |
| JP | 2005-038404 | 2/2005 |
| JP | 2005-228345 | 8/2005 |
| JP | 3734491 | 10/2008 |
| KR | 10-2004-0027270 | 4/2004 |
| KR | 10-2004-0048786 | 6/2004 |
| KR | 10-2004-0106278 | 12/2004 |
| KR | 10-2005-0077048 | 8/2005 |
| RU | 2004106570 | 8/2005 |
| RU | 2 417 421 | 4/2011 |
| RU | 2 433 449 | 11/2011 |
| RU | 2 442 212 | 2/2012 |
| WO | WO 00/73937 | 7/2000 |
| WO | 02/063876 | 8/2002 |
| WO | 2007/032909 | 3/2007 |
| WO | 2007/032910 | 3/2007 |
| WO | 2007/032913 | 3/2007 |
| WO | 2007-100518 | 9/2007 |

OTHER PUBLICATIONS

Person; Special Edition Using Microsoft Excel 97; Dec. 17, 1996; Que Publishing; pp. 125-138 and 208-223.*

Halberg et al.; Special Edition Using Microsoft Excel 97, Bestseller Edition; Oct. 16, 1997; Que Publishing; pp. 139-141 and 913-915.*

Chi et al.; A Spreadsheet Approach to Information Visualization, http://www2.parc.com/istl/projects/uir/pubs/items/UIR-1997-03-Chi-UIST97-Spreadsheet.pdf; 2 pages.

Chi, Ed; Exploring Visual Representations, http://www-users.cs.umn.edu/~echi/papers/infovis97/spread/node18.html; Jul. 22, 1997, 2 pages.

Davenport et al., "Numbers—A Medium That Counts," Jul. 1991, pp. 39-44.

Hallberg et al.; Special Edition Using Microsoft Excel 97, Bestseller Edition; Oct. 16, 1997, Que Publishing; pp. 4,10.

Treinish, Lloyd A.; A Function-Based Data Model for Visualization, http://researchweb.watson.ibm.com/people/l/lloydt/dm/function/dm_fn.htm; Sep. 27, 2005, 15 pages.

Varshney et al.; Finesse: A Financial Information Spreadsheet; proceedings of the 1996 IEEE Symposium on Information Visualization Symposium; pp. 70-71.

International Search Report and Written Opinion in PCT/US2007/004131, mailed Jul. 27, 2007, 8 pages.

Spreadsheet Visual Analyzer, Ver. 1.0, Download 3000, copyright 2003-2004, accessed at: http://www.download3000.com/download_12120.html; accessed on Feb. 1, 2006, 2 pages.

Batter, "Allison Balter's Mastering Microsoft® Office Access 2003"; Sams, Dec. 8, 2003; pp. 68-72.

Microsoft Office Assistance: Pivot Table reports 101; http://office.Microsoft.com/en-us/assistance/HA010346321033.aspx?mode=print, © 2005 Microsoft Corporation, 11 pages (printed Aug. 10, 2005).

Carlton Collins, Microsoft Business Solutions, Microsoft Excel Pivot Tables, "A Business Software Tip," http/www.microsoft.com/businesssolutions/excel_pivot_tables_Collins.mspx?pf=true, 13 pages, updated Jun. 3, 2005 (printed Aug. 10, 2005).

Data Palette, Wikipedia, Oct. 2007, 1 pg.

Fink, Keith; "Overview of PivotTables and PivotCharts in Microsoft Access 2002" dated Aug. 16, 2001, 44 pages.

Tatsuaki; "Microsoft's Data Access Techniques"; DB Magazine, vol. 15, No. 3, Copyright Jul. 1, 2005, 24 pgs.

Stinson et al., "Microsoft Office Excel 2003 Inside Out, Analysing Data with Pivot Table Reports"; Microsoft Office Excel 2003 Inside Out, Microsoft Press, Jan. 1, 2003; pp. 797-807.

(56) References Cited

OTHER PUBLICATIONS

Desmaris; "Using the Microsoft Pivot Table for Reliability Applications"; IEEE Annual Reliability Symposium; Reliability-Investing in the Future; Apr. 18, 1996; pp. 1-13.
Nakano; "Excel Function Cooking"; Nikkei Personal Computing, No. 460, pp. 201-204; Nikkei Business Publications, Inc.; Japan; Jun. 21, 2004.
Kimura; "Even if the Content is the Same; it Can Be Shown in Various Ways; Important Points for Utilizing Excel 'Display Format'"; Nikkei PC 21, vol. 11, No. 3, pp. 72-73, Nikkei Business Publications Inc.; Japan, Feb. 1, 2006.
Dictionary.com, LLC; "Spreadsheet"; Jul. 16, 2012, p. 1, Copyright 2012; Available World Wide Web "http://dictionary.reference.com/browse/spreadsheet?s=t", 3 pgs.
Protest Email "Microsoft patents same spreadsheet idea Twice"; Oct. 10, 2012; Patnews@ns1.patenting-art.com; 5 pgs. (provided by B. Haslam Oct. 16, 2012).
Wikipedia; "Choropoleth map"; accessed Oct. 11, 2012 at http://en.wikipedia.org/wiki/Choropleth_map; 4 pgs. (provided by B. Haslam Oct. 16, 2012).
Slashdot.org; "Microsoft Patents 1826 Choropleth Map Technique"; Oct. 9, 2012; accessed Oct. 11, 2012 at http://yro.slashdot.org/story/12/10/09/2055240/microsoft-patents-1826-choropleth-map-technique; 27 pgs. (provided by B. Haslam Oct. 16, 2012).
U.S. Official Action dated Dec. 8, 2010 cited in U.S. Appl. No. 11/223,527, 39 pgs.
U.S. Official Action dated Dec. 27, 2010 cited in U.S. Appl. No. 11/223,631, 22 pgs.
U.S. Official Action dated Apr. 11, 2011 cited in U.S. Appl. No. 11/223,631, 21 pgs.
U.S. Official Action dated Apr. 13, 2011 cited in U.S. Appl. No. 11/223,527, 40 pgs.
U.S. Official Action dated Jul. 31, 2012 cited in U.S. Appl. No. 11/223,527, 48 pgs.
Anonymous; "Conditional Formatting"; Internet Citation, Aug. 3, 2004, Retrieved from: http://web.archive.org/web/20040803153634/http://www.cpearson.com/excel/cformatting.htm; retrieved May 28, 2008; 4 pgs.
Stein J.D.; "Spreadsheet Smarts"; Internet Citation, 2000, Retrieved from Internet: http://www/aicpa.org/pubs/jofa/jan2000/stein.htm; retrieved May 28, 2008; 4 pgs.
Abramovich, S. et al., "Spreadsheet Conditional Formatting: An Untapped Resource for Mathematics Education"; Internet Citation, Oct. 5, 2005; Retrieved from Internet: http://epublications.bond.edu.au/ejsie/vol1/iss2/3/; 24 pgs.
PCT Search Report mailed Jan. 9, 2007, Appln No. PCT/US2006/033807, 3 pgs.
PCT Search Report mailed Jan. 11, 2007, Appln No. PCT/US2006/033808, 3 pgs.
PCT Search Report and Written Opinion mailed Feb. 16, 2007, Appln No. PCT/US2006/033876, 10 pgs.
EP Search Report mailed Nov. 17, 2008, Appln No. 06790086.0, 6 pgs.
EP Search Report mailed Jul. 20, 2009, Appln No. 06813959.1, 7 pgs.
Chinese Office Action dated Aug. 14, 2009 in Appln No. 200680032790.5, 11 pgs.
Chinese Office Action dated Aug. 21, 2009 in Appln No. 200780006781.3, 8 pgs.
Chinese Office Action dated Oct. 23, 2009 in Appln No. 200680032784.X, 7 pgs.
Japanese Notice of Rejection dated Nov. 10, 2009 in Appln No. 2008-530101, 4 pgs.
Chinese Second Office Action dated May 6, 2010 in Appln No. 200680032784.X, 6 pgs.
Chinese Office Action dated May 14, 2010 in Appln No. 20068003172.2, 11 pgs.
Chinese Second Office Action dated Jul. 30, 2010 in Appln No. 200680032790.5, 6 pgs.
Japanese Notice of Rejection dated Nov. 18, 2011 in Appln No. 2008-530098, 4 pgs.
Japanese Notice of Rejection dated Nov. 29, 2011 in Appln No. 2008-556365, 6 pgs.
Extended EP Search Report mailed Dec. 27, 2011, Appln No. 06802599.8, 7 pgs.
Mexican Office Action with summary dated Apr. 25, 2012 in Appln No. MX/a/2008/003319, 13 pgs.
Canadian Office Action dated May 10, 2012 in Appln No. 2617870, 5 pgs.
Japanese Notice of Rejection dated Aug. 10, 2012 in Appln No. 2008-556365, 6 pgs.
European Examination Report mailed Oct. 23, 2012 in EP 56695RK900kap, 4 pgs.
Japanese Notice of Rejection dated Mar. 5, 2013 cited in Appln No. 2012-036529, 5 pgs.
Korean Notice of Rejection dated Mar. 29, 2013 cited in Appln No. 10-2008-7020125, 4 pgs.
Korean Notice of Rejection dated Apr. 30, 2013 cited in Appln No. 10-2008-7005544, 8 pgs.
Canadian OA dated Aug. 2, 2013 cited in Appln No. 2,636,674, 3 pgs.
Japanese Notice of Rejection dated Nov. 7, 2013 in Appln No. 2012-044087, 6 pgs.
Canadian OA dated Dec. 23, 2013 cited in Appln No. 2,617,866, 2 pgs.
Malaysian Substantive Examination Report dated Jan. 15, 2014 in Appln No. PI 20080498, 3 pgs.
EP Search Report dated Feb. 10, 2014 in Appln No. PCT/US2007/004131, 7 pgs.
U.S. Official Action dated Apr. 1, 2008 cited in U.S. Appl. No. 11/222,660, 11 pgs.
U.S. Official Action dated May 7, 2008 cited in U.S. Appl. No. 11/333,895, 11 pgs.
U.S. Official Action dated Dec. 24, 2008 cited in U.S. Appl. No. 11/223,631, 23 pgs.
U.S. Official Action dated Jan. 13, 2009 cited in U.S. Appl. No. 11/333,895, 17 pgs.
U.S. Official Action dated Mar. 4, 2009 cited in U.S. Appl. No. 11/260,520, 13 pgs.
U.S. Official Action dated Mar. 30, 2009 cited in U.S. Appl. No. 11/223,527, 33 pgs.
U.S. Official Action dated Aug. 5, 2009 cited in U.S. Appl. No. 11/223,631, 21 pgs.
U.S. Official Action dated Aug. 24, 2009 cited in U.S. Appl. No. 11/333,895, 18 pgs.
U.S. Official Action dated Aug. 25, 2009 cited in U.S. Appl. No. 11/364,377, 25 pgs.
U.S. Official Action dated Oct. 26, 2009 cited in U.S. Appl. No. 11/223,527, 38 pgs.
U.S. Official Action dated Dec. 14, 2009 cited in U.S. Appl. No. 11/223,631, 21 pgs.
U.S. Official Action dated Dec. 29, 2009 cited in U.S. Appl. No. 11/364,377, 19 pgs.
U.S. Official Action dated Dec. 31, 2009 cited in U.S. Appl. No. 11/333,895, 15 pgs.
U.S. Official Action dated Jun. 3, 2010 cited in U.S. Appl. No. 11/223,631, 21 pgs.
U.S. Official Action dated Jun. 22, 2010 cited in U.S. Appl. No. 11/223,527, 36 pgs.
U.S. Official Action dated Jul. 29, 2010 cited in U.S. Appl. No. 11/223,631, 18 pgs.
U.S. Official Action dated Aug. 12, 2010 cited in U.S. Appl. No. 11/333,895, 21 pgs.
Notice of Allowance Received for Malaysia Patent Application No. PI 20080501, Mailed Date: Aug. 30, 2013, Filed Date: Aug. 29, 2006, 2 pgs.
Malaysia Notice of Allowance Received in Patent Application No. PI 20082804, Mailed Date: Sep. 13, 2013, Filed Date: Feb. 13, 2007, 2 Pages.
Japanese Office Action Received in Patent Application No. 2012-044087, Mailed Date: Mar. 18, 2014, Filed Date: Aug. 20, 2008, 5 Pages.

(56) References Cited

OTHER PUBLICATIONS

Canadian Notice of Allowace dated Apr. 3, 2014 in Appln No. 2,618,224, 2 pgs.
Canadian Notice of Allowace dated May 8, 2014 in Appln No. 2,617,866, 2 pgs.
Japanese Notice of Rejection dated Oct. 12, 2012 in Appln No. 2008-530097, 5 pgs.
Canadian Notice of Allowance dated May 8, 2014 in Appln No. 2,617,866, 2 pgs.
Chi et al., "A Spreadsheet Approach to Information Visualization"; In Proceedings of IEEE Symposium on Information Visualization; Oct. 21, 1997; http://citeseerx.ist.psu.edu/viewdoc/download?doi=10.1.1.24.6964&rep=rep1&type=pdf; 11 pgs.
Scott et al., "PivotTable and PivotChart Reports, & Macros in Microsoft Excel"; Biostatistician III, Department of BiostatisticsVanderbilt University; https://www.mc.vanderbilt.edu/gcrc/workshop_files/2008-02-22.pdf; 20 pgs.
"OpenOffice 1.1.x"; http://www.openoffice.org/documentation/manuals/OOo1.x.x/user_guide.pdf; 442 pgs.
"Quattro Pro 9"; In Quattro Pro 9; http://www.ci.kinston.nc.us/pdfs/qp9en.pdf; 796 pgs.
Stolte et al., "Polaris: A System for Query, Analysis, and Visualization of Multidimensional Relational Databases"; In Proceedings of IEEE Transactions on Visualization and Computer Graphics, vol. 8, No. 1; Jan. 2002; http://graphics.stanford.edu/papers/polaris_extended/polaris.pdf; 14 pgs.
EP Communication dated Jul. 22, 2014 in Appln No. 06 790 086.0, 5 pgs.
Mexican Notice of Allowance dated Aug. 8, 2014 in Appln No. MX/a/2008/009869, 4 pgs.

\* cited by examiner

Format all cells based on their values:

Format Style: Data Bars

| | Shortest Bar | Longest Bar |
|---|---|---|
| Type: | Percentile | Percentile |
| Value: | 10 | 90 |
| Bar Color: | | |

Preview:

*Fig.4B.*

| A | |
|---|---|
| 1 | |
| 2 | 6 |
| 3 | 16 |
| 4 | 17 |
| 5 | 25 |
| 6 | 9 |
| 7 | 12 |
| 8 | 9 |
| 9 | 11 |
| 10 | 18 |
| 11 | 8 |
| 12 | 4 |
| 13 | 19 |
| 14 | 28 |
| 15 | 22 |
| 16 | 18 |

DYNAMIC THRESHOLDS FOR CONDITIONAL FORMATS

CROSS REFERENCE TO RELATED APPLICATION

This application is a continuation of U.S. patent application Ser. No. 11/364,377 titled "Dynamic Thresholds for Conditional Formats" and filed Feb. 27, 2006, the contents of which are incorporated herein by reference.

BACKGROUND

Data visualization techniques enable users of data to scan and quickly comprehend large quantities of information. Such techniques may also aid in alerting users to anomalies and other data of interest. Visualization tools can include charts, graphs, and reports that collect, summarize, and/or otherwise transform data into meaningful shapes, colors, and patterns. Closer to the source, data visualization has also included the use of conditional formatting in spreadsheets, which frequently serve as receptacles of raw data.

Figure 1:
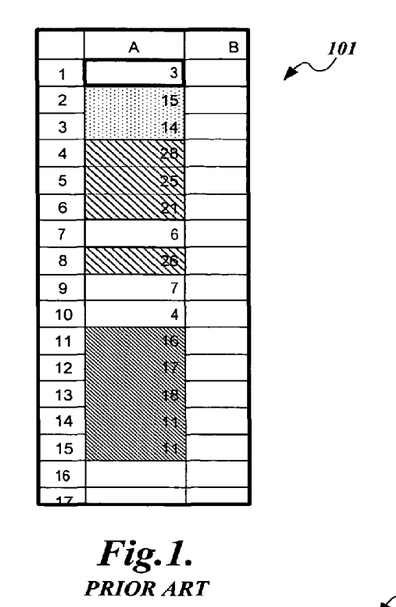
FIG. 1 depicts a prior art example of a range of conditionally formatted cells in a spreadsheet.

Conditional formatting has enabled users to modify the look of data in place, changing the appearance of individual spreadsheet or table cells based on the content of the cell (or some other determining condition). FIG. 1 depicts a prior art range of cells 101 in a spreadsheet, the cells of which have been conditionally formatted. Here, cell A1 provides an example of the default or unformatted version of a cell. Cell A2 provides an example of a first conditionally formatted cell, and cell A4 provides an example of a second conditionally formatted cell. Cells A2 and A4 have automatically received new formatting based on a condition associated with the cells.

Figure 2:
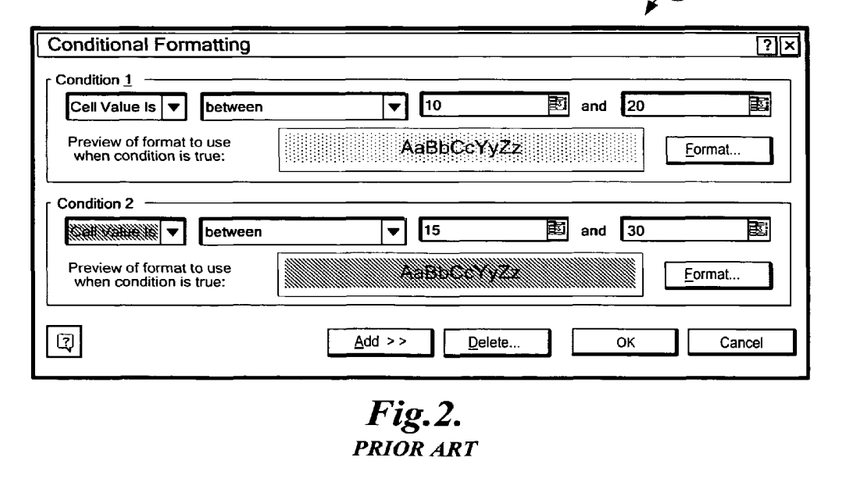
FIG. 2 depicts a prior art example of a dialog for conditionally formatting cells.

FIG. 2 depicts a prior art dialog 201 where formats conditioned upon values being within certain ranges have been selected. The two conditions supplied here (and applied to the range of cells 101) format cells in a particular fashion when the value contained within each cell is evaluated as being between a certain range (10 and 20 for condition 1, 15 and 30 for condition 2). The conditions utilized in conditional formats are limited to two possible Boolean outputs, TRUE or FALSE. If the condition supplied evaluates to TRUE, then the format is applied. If the condition supplied evaluates to FALSE, then the format is not applied.

Dialog 201 demonstrates that, while useful, conditional formatting can be limiting as to certain available formats (e.g., font, cell color, borders). Furthermore, a given range of cells is provided a maximum number of conditional formats that can be applied, certainly no more than three conditions, each providing no more than one possible format when evaluating to TRUE. Additionally, the threshold values used for evaluation are fixed. These limitations prevent conditionally formatted cells from fully realizing their potential as analysis and reporting tools.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention provide the ability to utilize dynamic thresholds and dynamic threshold values when generating variable formatting rules to be applied to a range of cells. According to one aspect, a computer-readable medium having computer executable components for determining dynamic threshold values for variable formatting a range of cells is provided. The computer-readable medium includes a variable format command component, a threshold type component and a dynamic threshold value component. The variable format command component maintains the variable format that is applied to a range of cells and the threshold type component identifies threshold types included in the variable format that utilize a dynamic threshold value. As discussed below, threshold types that utilize dynamic threshold values include, but are not limited to, Highest value, Lowest value, Middle value, Percentile, Percent, and Formula. The dynamic threshold value component determines the value that is to be used as the dynamic threshold value. The value is determined from values contained in a plurality of cells, which may be the range of cells or cells outside the range of cells.

According to another aspect, a method for determining a dynamic threshold value is provided. The method includes identifying a range of cells for which a dynamic threshold value is to be determined and evaluating the values contained in the range of cells to identify a value matching a threshold type requirement. The identified value is selected as a dynamic threshold value for the threshold type.

In accordance with another aspect, a computer-implemented method for formatting a range of cells using variable formats is provided. The computer-implemented method includes defining a variable format to be applied to a range of cells. The defined variable format includes a threshold point having a threshold type. Additionally, the threshold type utilizes a dynamic threshold value as a value for the threshold type. The dynamic threshold value is determined based on the threshold type and based on the values contained in the range of cells.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Formats need not be evaluated using only TRUE or FALSE as determinative results. Instead, cell formats applied can vary depending upon an associated value (e.g., the value in the cell itself), providing more formats which may be more meaningful to a user. Formats may be applied to a range of cells, where a format value is determined for each cell in the range, and one or more aspects of the format vary based on the format value. For example, as the value in a cell increases, the background color or shade is adjusted, or the size of an in-cell data bar grows, or the selection of an in-cell icon changes. Additionally, the format value itself may be dynamic in that it is determined based on an evaluation of the values contained in a range of cells or an evaluation of a formula.

Figure 3A:
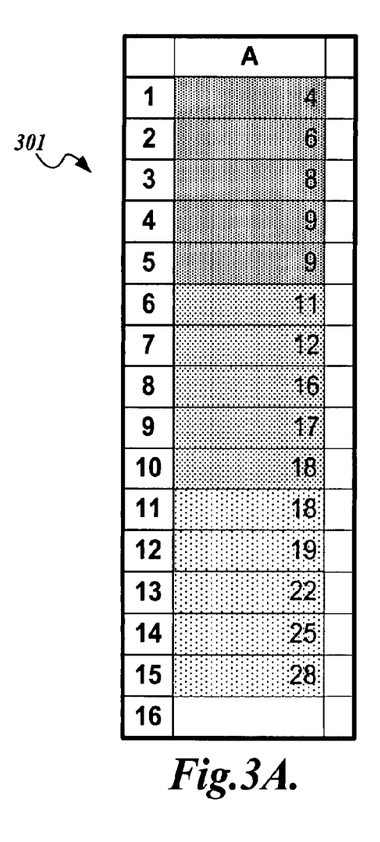
FIG. 3A depicts a range of cells formatted using color scale style variable formatting according to one or more embodiments of the present invention.

FIG. 3A depicts a range of cells 301 formatted using color scale style variable formatting. Rather than being limited to three output formats (i.e., three conditions, one format each), the cells have a variable format applied that may produce any number of distinct cell formats. The cells within range 301 have values that are ordered from lowest to highest. Here, the value contained in each cell is used to determine a background fill to be applied to each cell. In this example, three hatching densities are specified for the two endpoints and the midpoint. The intervening hatchings are computed for values falling in between. The endpoint values within the range are held within cells A1 and A15. The background fill for each cell ranges from dense hatching (A1) to medium-density hatching (A8) to light density hatching (A15). Cells A2-A7 have background hatching applied by linearly varying the density between dense hatching and medium-density hatching. Cells A9-A14 have background hatching applied by linearly varying the density between medium-density hatching and light density hatching.

While the examples provided herein for background fill utilize hatching, any type and format of a background fill may be applied in accordance with one or more embodiments of the present invention. For example, background fill may be applied using varying shades of colors. In one example, the lowest value may be assigned the color red as the background fill, the middle value may be assigned yellow as the background fill, and the highest value may be assigned green as the background fill. All cells with values falling between those ranges may be assigned a varying shade of those colors as the background fill based on the respective value of the cell.

Figure 3B:
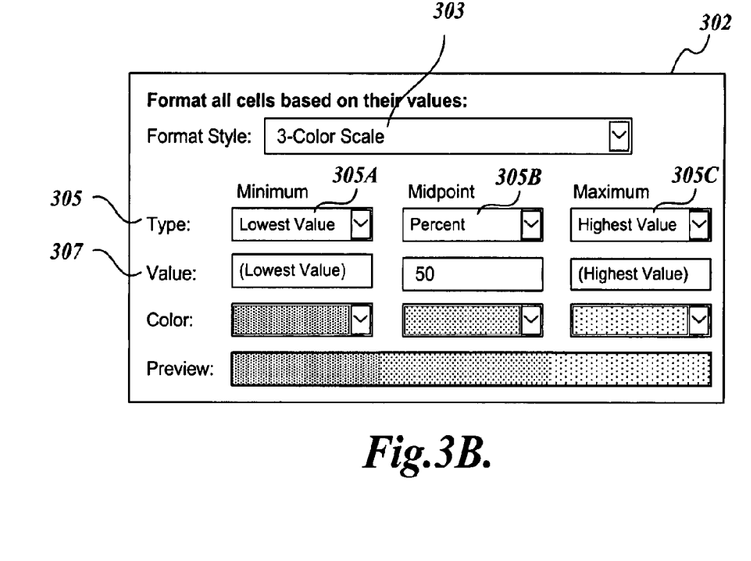
FIG. 3B depicts an input dialog with which a user may specify the variable formatting parameters for FIG. 3A according to one or more embodiments of the present invention.

FIG. 3B depicts a variable format input dialog 302 with which a user may specify the parameters of a variable format for a cell range 301. The input dialog 302 may represent a portion of a larger dialog. When creating a variable format, a user may first select a range of cells 301. The user may then request or command that a variable format be applied, causing a variable format input dialog 302 to be displayed. The user may select a style of format 303, here "3-Color Scale." Once a style 303 is selected, the appropriate input boxes allow a user to specify the parameters of the variable format to be applied.

For a 3-Color Scale, the input boxes allow a user to specify the threshold type used to assign formats to cells in the range of cells. This is determined by using the Type pulldown 305 for each threshold point of "Minimum" 305A, "Midpoint" 305B and "Maximum" 305C. The Minimum type pulldown 305A may provide threshold type choices including, but not limited to, "Lowest Value," "Number," "Percent," "Percentile," and "Formula." The Midpoint type pulldown 305B may provide threshold type choices including, but not limited to, "Middle Value," "Number," "Percent," "Percentile," and "Formula." The Maximum type pulldown 305C may provide threshold type choices including, but not limited to, "Highest Value," "Number," "Percent," "Percentile," and "Formula."

For "Lowest Value," which is only usable with the "Minimum" threshold point, the system will evaluate all of the values in the selected range of cells and dynamically select the lowest value as the threshold value for Minimum. For "Highest Value," usable only with "Maximum" threshold point, the system evaluates and dynamically selects the highest value contained in the range of cells as the threshold value for Maximum. Likewise, for "Middle Value," usable only with the "Midpoint" threshold point, the system evaluates and dynamically selects the middle value contained in the range of cells as the threshold value for Midpoint. Dynamic selection of threshold values is described in more detail with respect to FIGS. 8 and 9.

For "Number," the user actually assigns the threshold value to be used in evaluating the range of cells. If the user selects "Number," he or she enters the threshold value to be associated in the input box below the pulldown. If the user selects "Number" for all three columns, then the values entered may be validated to, for example, ensure that the Minimum value is less than the Midpoint value, which is in turn less than the Maximum value.

For "Percent," the user may enter a percent to associate with the background fill of the range of cells. Alternatively, the system may compute a percent value based on the threshold point and the values contained in the selected range of cells. Percent values correspond to a point in the delta between the minimum value and maximum value in the range of the selected cells. The system may evaluate all of the values within the range of cells in order to determine a computed percent for the threshold point and to determine the background fill to apply to the selected range of cells. For example, if the values in the selected cells range from 0 to 200, then a value with "25%" would correspond to the value 50. If this is being evaluated for the Minimum threshold point, 50 would be the calculated Minimum threshold value and any cells having values less than 50 are assigned the same background fill as that assigned to Minimum.

"Percentile" differs from "Percent" in that it doesn't determine percentages within the range of values. Rather, "Percentile" examines the set of values contained in the cells, orders them, and uses their ordinality or position within the set of ordered values to determine their percentile. In a set of ten ordered cells, the 40th percentile would always be the fourth cell, regardless of the value contained within it. If a user selects "Percentile" and enters 40, then the cell at the 40th percentile will be assigned the associated color. Alternatively, the system may dynamically compute a percentile value based on the threshold point and the values contained in the selected range of cells. The system may evaluate all of the values within the range of cells, order them, and use their ordinality or position within the set of ordered values to compute a value based on the threshold point being considered. For example, if there are ten ordered cells, the fifth cell will always be the 50th percentile. If the threshold point being evaluated is Midpoint, the value from the fifth cell, i.e., the 50th percentile, will be the computed threshold value.

Finally, "Formula" allows a user to enter a formula into the Value input box 307. In most cases, the value used for formatting a cell is one and the same as the value in the cell. Here, however, a formula is evaluated to determine the value to be used as the threshold value. The value of the cell is compared to the determined threshold value and the cell is formatted accordingly. A user may construct a formula using functions, cell references (within or outside the range of selected cells), operators, and so forth to arrive at a threshold value. As noted above, other types of values and algorithms may be used to allow a user to associate a cell range with particular formats.

Once a type 305 is selected for each of the three threshold points of interest, a threshold value 307 evaluated or entered, and a background fill selected, a user may interact with the variable format command to apply it to the selected range of cells. Before accepting the command, the system may validate the values entered in order to ensure that the Minimum value is less than the Midpoint value, which is less than the Maximum value. Such validation may not be possible until later, however, if values are not immediately known, such as when a formula is used as one or more of the threshold values.

If the threshold values are all of the same type, except formula, the system may validate that the Minimum value is less than the Midpoint value, which is less than the Maximum value. If the threshold values are of a mixed type, or are all formulas, the system may not validate to ensure that the Minimum value is less than the Midpoint value, which is less than the Maximum value. However, when the conditions are evaluated for application of the background fill to the selected range of cells, and the system encounters an instance where the Minimum value is greater than the Midpoint value, where the Minimum value is greater than the Maximum value, or wherein the Midpoint value is greater than the Maximum value, the system may rearrange the threshold values in ascending order. For example, if the threshold values are dynamic and evaluate such that the Minimum value, Midpoint value, and Maximum value are 500, 10, and 50, respectively, the system may rearrange the values so that 10 is the Minimum value, 50 is the Midpoint value, and 500 is the Maximum value. The background fill associated with each threshold point may or may not be rearranged accordingly.

Additionally, if two or more dynamic threshold values evaluate to the same value, it may be specified that the background fill associated with the higher threshold point is applied to cells containing the value. Alternatively, the system may notify the user and allow the user to alter the threshold values and/or specify which background fill is to be applied.

Once a variable format is applied, making changes to the values in the selected range of cells, or in the case of Formula thresholds, any other cell(s) on which the threshold evaluation is based, may cause the formatting to be updated in some embodiments. If a value changes to become the new "lowest value," then all formatting may dynamically adjust appropriately. Likewise, if an additional cell is inserted into the range of cells, it may change the percentages, percentiles, formulas, etc. causing the system to evaluate and possibly adjust the background fills applied to the range of cells.

Figure 4A:
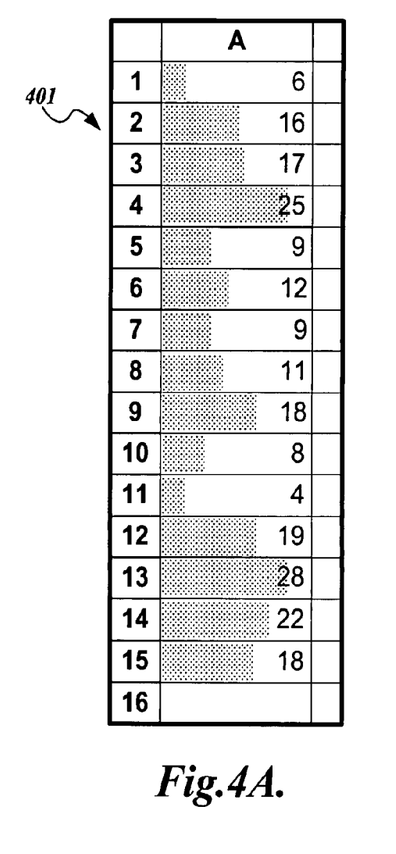
FIG. 4A depicts a range of cells formatted using data bar style variable formatting according to one or more embodiments of the present invention.

FIG. 4A depicts a range of cells 401 formatted using data bar style variable formatting. Data bars may be depicted within cells and can provide a visual cue for users, indicating larger and smaller values in the range. The data bars within each cell have a length that is determined based on the value in the cell and the thresholds applied to the range of cells. For example, cells A1 and A11 contain the shortest bars, corresponding to the values 6 and 4 respectively. Cells A4 and A13 have the longest bars, corresponding to the values 25 and 28 respectively. Although the data bars shown here are displayed as being filled with a hatching gradient, other types of data bars may be displayed, including solid bars, bars with patterns, and so forth.

In addition, although horizontal data bars are described here, other types of dynamically modified in-cell shapes may be used, each having an aspect modified depending upon the format value for the cell. Examples may include a pie with an automatically adjusting slice, a vertical data bar, and so forth. Furthermore, data bars may be combined with the background formatting described above, such that the hatching density of a bar changes based on the same format value, or possibly using a different format value (e.g., a formula) from the one used to determine the length of a bar.

Figure 4B:
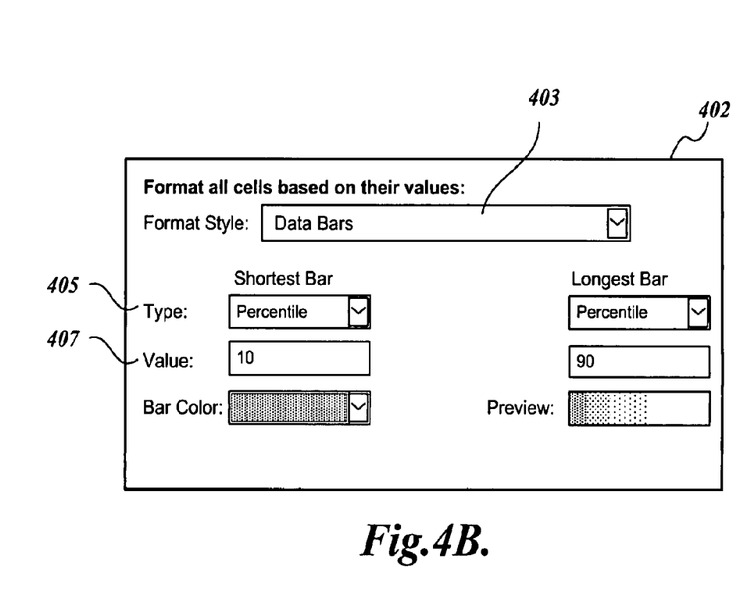
FIG. 4B depicts an input dialog with which a user may specify the variable formatting parameters for FIG. 4A according to one or more embodiments of the present invention.

FIG. 4B depicts an input dialog 402 with which a user may specify the parameters of a variable format for a cell range 401. Here, Data Bars have been selected as the format style 403 for the range of cells 401 which provides two thresholds, "Shortest Bar" and "Longest Bar." Dialog 402 enables a user to set the format types 405 and values 407 that will be used when evaluating the thresholds. Furthermore, the dialog allows the user to manually set the color or hatching density 409 of the bars. As with dialog 302, upon entering the variable format command, some form of input validation may be performed.

Figure 5A:
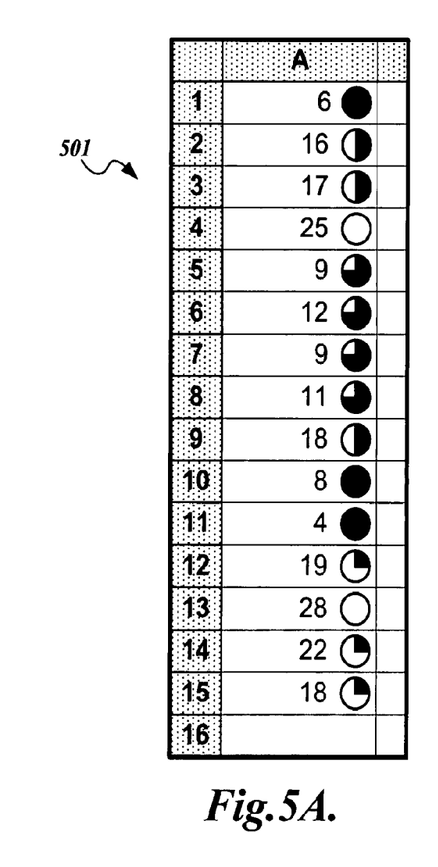
FIG. 5A depicts a range of cells formatted using icon style variable formatting according to one or more embodiments of the present invention.

FIG. 5A depicts a range of cells 501 formatted using icon style variable formatting. Icons may be associated with subsets of the range of values associated with the range of cells 501. Icons may come in groups of three, four, five, or more. Here, pie icons have been inserted by a program module into individual cells within the range of cells 501 based on assigned threshold values.

Figure 5B:
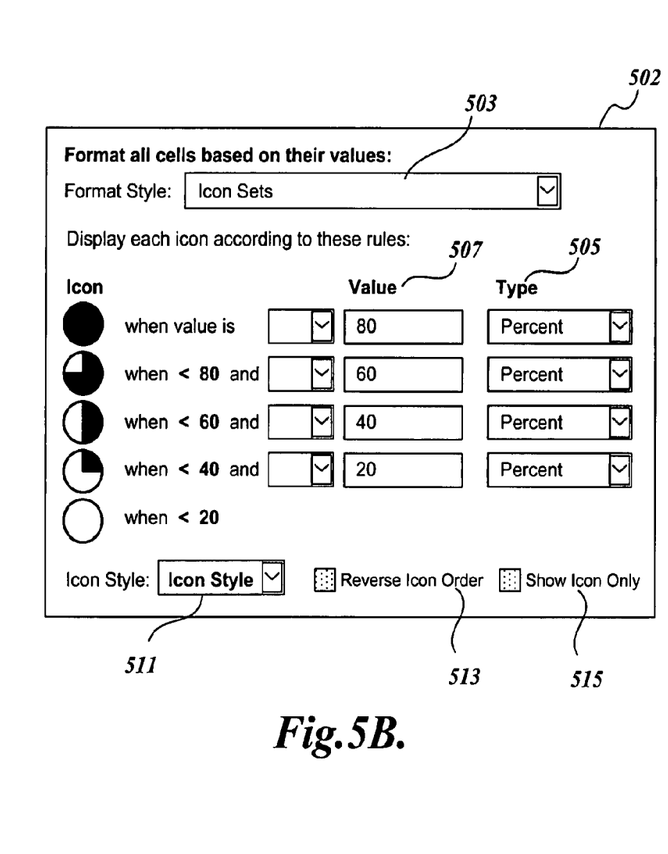
FIG. 5B depicts an input dialog with which a user may specify the variable formatting parameters for FIG. 5A according to one or more embodiments of the present invention.

FIG. 5B depicts an input dialog 502 with which a user may specify the threshold values of a variable format for cell range 501. The Format Style 503 selected for cell range 501 is Icon Sets, allowing the user to select an Icon Set and apply value ranges 507 and evaluation type 505 for each of the icons. For each icon in the set, a user can assign a comparison operator (e.g., >, ≥, <, ≤), and select an evaluation type of "Number," "Percent," "Percentile," or "Formula." In this fashion, the user assigns ranges of threshold values to each icon, and a program module can evaluate the selected range of cells based on the threshold values and display the appropriate in-cell icon. Additional portions of the dialog may enable a user to modify the icon style 511, to reverse the icon order 513, and to hide a cell's value and only display the determined icon 515. As discussed above, if the evaluation type 505 is selected to be "Percent" or "Percentile," the system may evaluate the cells and provide a computed threshold value as a selected value.

Figure 6A:
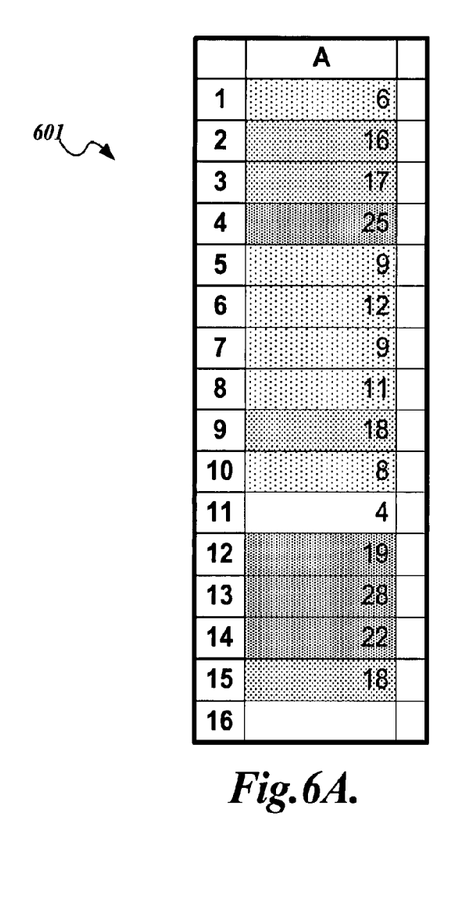
FIG. 6A depicts a range of cells formatted using another form of color scale style variable formatting according to one or more embodiments of the present invention.
Figure 6B:
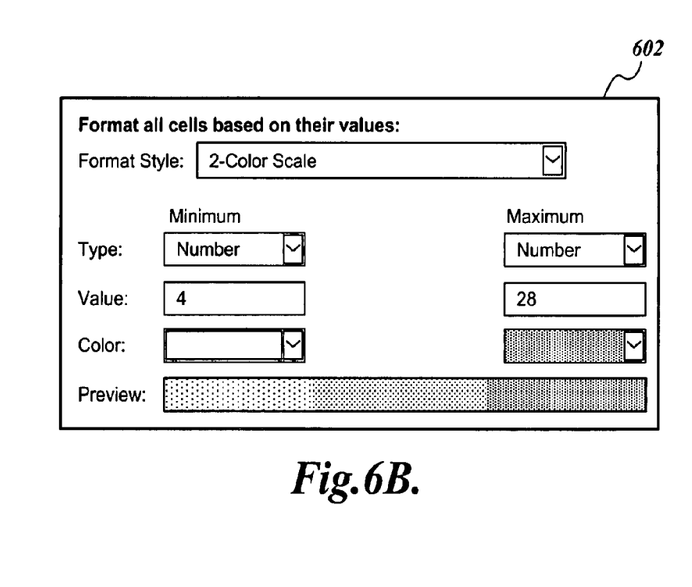
FIG. 6B depicts an input dialog with which a user may specify the variable formatting parameters for FIG. 6A according to one or more embodiments of the present invention.

FIG. 6A depicts a range of cells 601 formatted using 2-color scale style variable formatting. The 2-color scale depicted works in the same fashion as the 3-color scale, except that no midpoint threshold is provided. FIG. 6B depicts an input dialog 602 with which a user may specify the parameters of a variable format for a cell range 601. This dialog again works similarly to dialog 302 described for the 3-color scale, the difference being the lack of a midpoint input.

Figure 7:
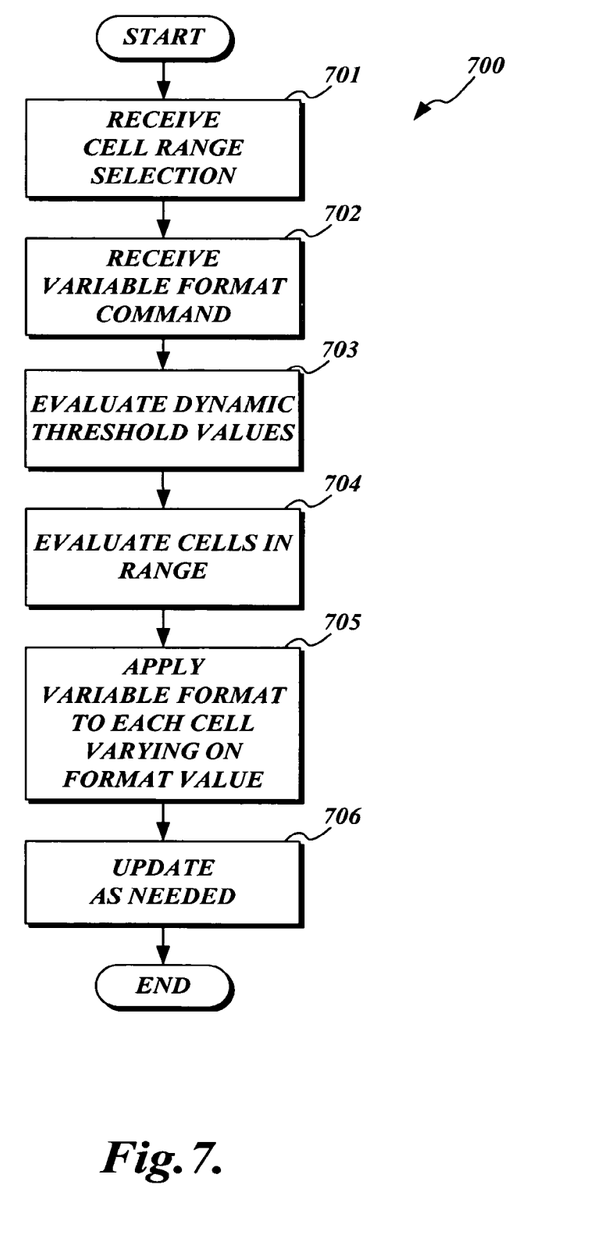
FIG. 7 is a flow diagram depicting a method for applying a variable format to a range of cells according to one or more embodiments of the present invention.

FIG. 7 is a flowchart depicting a method for applying a variable format to a range of cells. Initially, at step 701, the selection of a range of cells is received. Next, a variable format command is received at step 702. Dialogs 302, 402, 502, and 602 present examples of visual interfaces that may be used to set the parameters, threshold points, and threshold types, associated with a variable format command. At block 703, any dynamic threshold values are determined for the threshold points and threshold types selected in the dialog. Determination of dynamic threshold values is discussed in more detail with respect to FIGS. 8 and 9. At step 704, the range of cells is evaluated based on the variable format applied. Once the cells are evaluated, the formatting can be applied to each cell by selecting the format from a range of formats based on the evaluation, as illustrated by block 705. At step 706, changes in the format values or other changes to the range of cells may require updates to cell formats.

Figure 8:
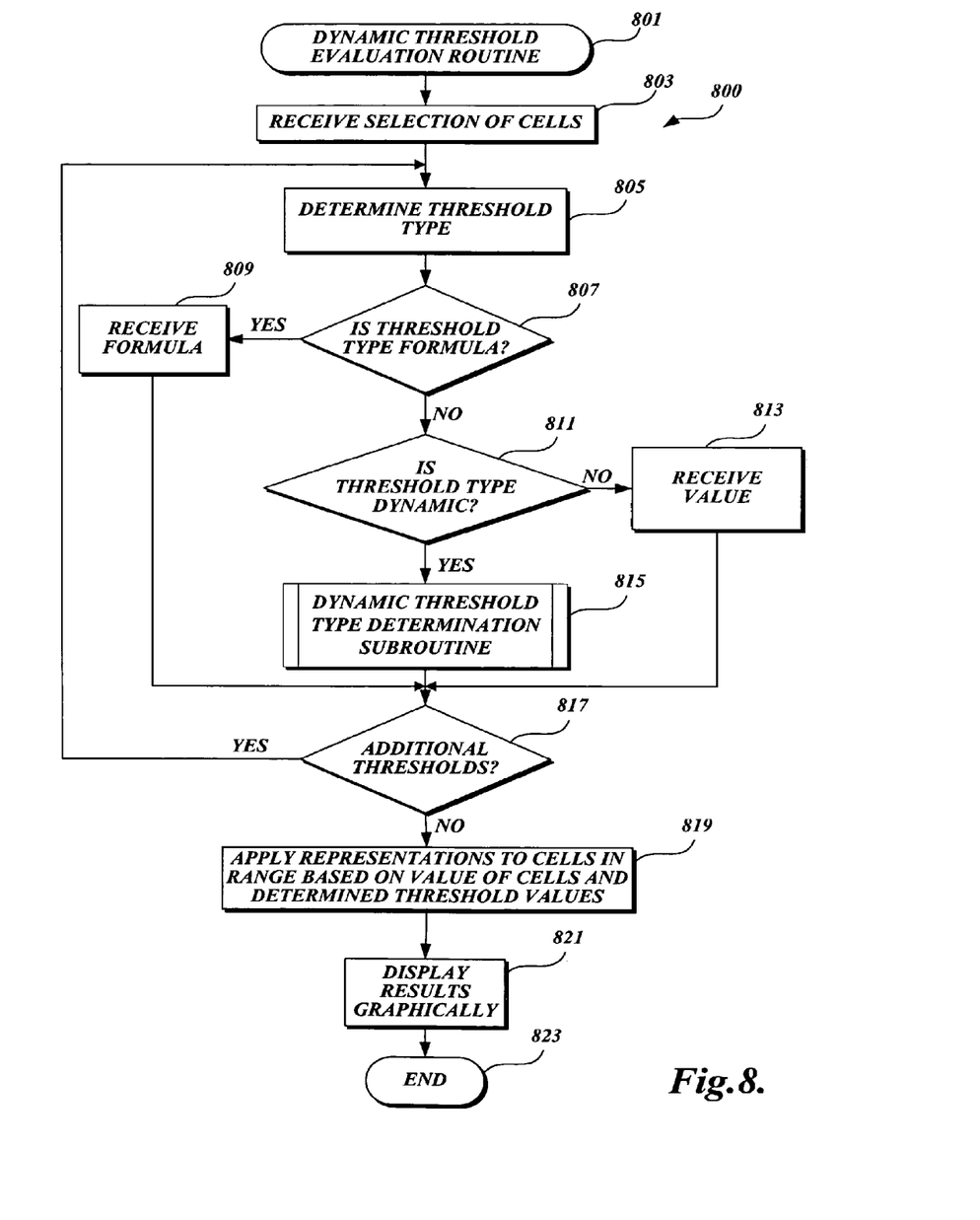
FIG. 8 is a flow diagram of a dynamic threshold routine for applying dynamic thresholds to a range of cells according to one or more embodiments of the present invention.

FIG. 8 is a flow diagram of a dynamic threshold evaluation routine for evaluating dynamic thresholds and dynamic threshold values, according to one or more embodiments of the present invention. The routine 800 begins at block 801 and at block 803, a selection of a range of cells is received. At block 805, a threshold type for one threshold point of a variable formatting command to be applied to the selected range of cells is determined. As discussed above, the threshold type may be, but is not limited to, number, percent, percentile, highest value, lowest value, middle value, and formula. At decision block 807, it is determined whether the threshold type is "formula." If it is determined at decision block 807 that the threshold type is "formula," a formula entry dialog is provided that allows the user to input a formula that will be evaluated to determine the threshold value. The received formula may be any type of formula and may utilize values contained in cells that are included in the selected range of cells, cells outside the range of cells, or any combination thereof. In one embodiment, the formula may not be validated or evaluated until requested by the user because in some instances the cells that are to be used to provide values for use in the formula may not yet be populated with data.

Returning to decision block 807, if it is determined that the threshold type is not "formula," at decision block 811 it is determined whether the threshold type is a dynamic threshold type other than formula. If it is determined at decision block 811 that the threshold type is dynamic, the routine 800 proceeds to the dynamic threshold type determination subroutine, as illustrated by subroutine block 815 and as described in more detail with respect to FIG. 9. However, if it is determined at decision block 811 that the threshold type is not dynamic, at block 813 a value for the threshold value is received from the user.

After a value is received at block 813, or after the dynamic threshold type determination subroutine 815 has completed, at decision block 817 it is determined whether there are any additional thresholds to be evaluated for the selected range of cells. If it is determined at decision block 817 that there are additional thresholds to be evaluated, the routine 800 returns to block 805 and continues. However, if it is determined at decision block 817 that there are no additional thresholds for which a threshold value is to be determined, at block 819, the selected cells are evaluated based on the thresholds and the determined threshold values. The background fills associated with each threshold point are applied to each selected cell based on the evaluation. At block 821, the applied representations are displayed graphically to a user. The routine 800 completes at block 823.

Figure 9:
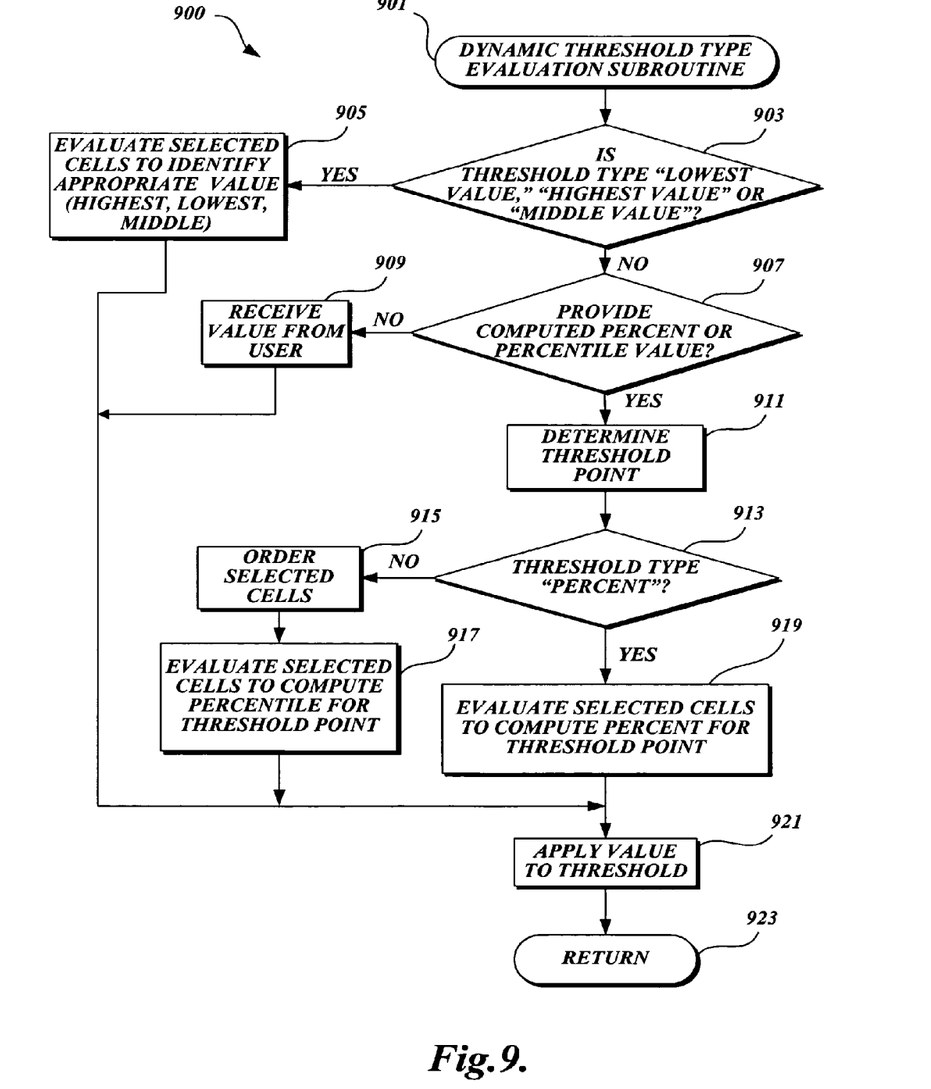
FIG. 9 is a flow diagram of a dynamic threshold type evaluation subroutine for evaluating dynamic thresholds that utilize a dynamic value as a threshold value according to one or more embodiments of the present invention.

FIG. 9 is a flow diagram of a dynamic threshold type determination subroutine for determining threshold values for dynamic thresholds, in accordance with one or more embodiments of the present invention. The routine 900 begins at block 901 and at decision block 903 a determination is made as to whether the dynamic threshold type is "Lowest value," "Highest value," or "Middle value." If it is determined at decision block 903 that the threshold type is "Highest value," "Middle value," or "Lowest value," at block 905 the selected cells are evaluated to identify the cell containing the appropriate value. For example, if the selected threshold type is lowest value, the system will evaluate each of the selected cells to identify the cell containing the lowest value. Likewise, if the threshold type is "Middle value" or "Highest value," the system will evaluate the selected cells to identify the cell containing the middle value or highest value, respectively, from the values contained in the selected cells.

If it is determined at decision block 903 that the threshold type is not "Highest value," or "Middle value," then the dynamic threshold type is either "Percent" or "Percentile." At decision block 907, it is determined whether a computed percent or percentile value is to be provided as the threshold value. If it is determined at decision block 907 that a computed percent or percentile value is not to be provided as the threshold value, at block 909 a threshold value is received from the user. However, if it is determined at decision block 907 that a computed percent or percentile value is to be provided, at block 911 the threshold point being considered is determined. As discussed above, the threshold point is dependent upon the selected Format Style. For example, if the user selects a Format Style of "3-Color Scale" (see e.g., FIG. 4B) there are three threshold points: "Minimum," "Midpoint," and "Maximum."

At decision block 913, it is determined whether the threshold type for the threshold point is "Percent." If the threshold type is not "Percent," then the threshold type is "Percentile," and at block 915 the selected cells are ordered by value. At block 917, the selected cells are evaluated to identify the percentile value appropriate for the threshold point. For example, if the threshold point is "Minimum," the system may identify the value that is the 20th percentile for the values of the selected cells. In the example, above, if there are ten selected cells, the value contained in the second cell will be the 20th percentile. Similarly, if the threshold point is "Maximum," the system may identify the 80th percentile value as the computed value. Likewise, for a threshold point of "Middle," the system may identify the value at the 50th percentile.

However, if it is determined at decision block 913 that the threshold type is "Percent," at block 919 the selected cells are evaluated to compute a percent value for the selected threshold point. For example, if the threshold point is "Minimum," the system may determine the 25% value as the computed threshold value. In the case where the values in the selected cells range from 0 to 200, then a value of "25%" would be 50. If the threshold point is "Midpoint," the system may identify the 50% value as the computed threshold value. Likewise, if the threshold point is "Maximum," the system may identify the 75% value as the computed threshold value.

After the dynamic threshold values have been computed at block 905, 917, or 919, or received at block 909, they are applied as the threshold values for the threshold point at block 921. At block 923 subroutine 900 returns control to the dynamic threshold evaluation routine 800 (FIG. 8).

As discussed above, the dynamic threshold values may automatically change in response to a change in cell values of the selected cells or in response to a change in the range of selected cells. For example, a user may change a value in a cell such that the new value is a new lowest value for the range. If a variable formatting applied to those cells includes a threshold type of Lowest value, the corresponding threshold value will be dynamically adjust to the new lowest value contained in the range of cells. Additionally, in response to adjusting a dynamic threshold value, the evaluation of the selected cells is updated and the formatting is applied to the range of cells based on the new dynamic threshold values.

Referring back to FIG. 8, in response to receiving a change to a cell value in a selected range of cells, or in response to receiving a change in the number of selected cells, the routine 800 initiates at block 805 for the range of cells that include the change. That routine continues to completion at block 923, thereby dynamically adjusting the dynamic threshold values and updating the graphically displayed results.

While illustrative embodiments have been illustrated and described, it will be appreciated that various changes can be made therein without departing from the spirit and scope of the invention.

What is claimed:

1. A method for determining dynamic threshold values for variable formatting a range of cells, comprising:
    determining a range of cells;
    determining a format style, wherein the format style is one of an icon set; data bars; or a color scale;
    determining a first threshold type, wherein the first threshold type is one of a value; a percent; a percentile; a number; or a formula;
    determining a second threshold type, wherein the second threshold type is one of a value; a percent; a percentile; a number; or a formula;
    evaluating the content of all of the cells in the range of cells to determine a first dynamic threshold value that is within the range of cells based on the first threshold type and a first threshold point; and
    evaluating the content of all of the cells in the range of cells to determine a second dynamic threshold value that is within the range of cells based on the second threshold type and a second threshold point;
    evaluating the content of all the cells in the range of cells to determine a format value for each cell in the range of cells; and
    comparing the format value of each cell in the range of cells to the determined first dynamic threshold value and the determined second dynamic threshold value; and
    applying the format style to each cell in the range of cells based on the comparison between the format value of each cell in the range of cells and the determined first dynamic threshold value and the determined second dynamic threshold value such that the format style of each cell in the range of cells varies according to the format value of the cell in relation to the determined first dynamic threshold value and the determined second dynamic threshold value.

2. The method of claim 1, wherein the first dynamic threshold value and the second dynamic threshold value are determined based on the selected threshold type and based on a comparison of the values within the range of cells.

3. The method of claim 1, wherein at least one of the first threshold type and second threshold type is a lowest value threshold type; and
    wherein at least one of the first dynamic threshold value and the second dynamic threshold value is determined to be a lowest value contained in the range of cells.

4. The method of claim 1, wherein at least one of the first threshold type and second threshold type is a highest value threshold type; and
    wherein at least one of the first dynamic threshold value and the second dynamic threshold value is determined to be a highest value contained in the range of cells.

5. The method of claim 1, wherein at least one of the first threshold type and second threshold type is a middle value threshold type; and
    wherein at least one of the first dynamic threshold value and the second dynamic threshold value is determined to be a middle value contained in the range of cells.

6. The method of claim 1, wherein at least one of the first threshold type and second threshold type is a percent threshold type; and
    wherein at least one of the first dynamic threshold value and the second dynamic threshold value is determined to be a delta value between a minimum value in the range of cells and a maximum value in the range of cells.

7. The method of claim 1, wherein at least one of the first threshold type and second threshold type is a percentile value threshold type; and
    wherein at least one of the first dynamic threshold value and the second dynamic threshold value is determined to be a value selected from the range of cells that is a percentile of the values contained in the range of cells.

8. The method of claim 1, wherein at least one of the first threshold type and second threshold type is a function threshold type; and
    wherein at least one of the first dynamic threshold value and the second dynamic threshold value is determined based on a computation of a provided function that utilizes values from the range of cells.

9. The method of claim 1, wherein when the format style is the color style, the color applied to each of the cells in the range of cells is dynamically determined.

10. A computer storage device, having a processor and computer-executable instructions that, when executed by a processor, perform a method for determining dynamic threshold values for variable formatting a range of cells, the method comprising:
    determining a range of cells;
    determining a format style, wherein the format style is one of an icon set; data bars; or a color scale;
    determining a first threshold type, wherein the first threshold type is one of a value; a percent; a percentile; a number; or a formula;
    determining a second threshold type, wherein the second threshold type is one of a value; a percent; a percentile; a number; or a formula;
    evaluating the content of all of the cells in the range of cells to determine a first dynamic threshold value that is within the range of cells based on the first threshold type and a first threshold point; and
    evaluating the content of all of the cells in the range of cells to determine a second dynamic threshold value that is within the range of cells based on the second threshold type and a second threshold point;
    evaluating the content of all the cells in the range of cells to determine a format value for each cell in the range of cells;
    comparing the format value of each cell in the range of cells to the determined first dynamic threshold value and the determined second dynamic threshold value; and applying the format style to each cell in the range of cells based on the comparison between the format value of each cell in the range of cells and the determined first dynamic threshold value and the determined second dynamic threshold value such that the format style of each cell in the range of cells varies according to the format value of the cell in relation to the determined first dynamic threshold value and the determined second dynamic threshold value.

11. The computer storage device of claim 10, wherein at least one of the first threshold type and second threshold type is a middle value threshold type; and wherein at least one of the first dynamic threshold value and the second dynamic threshold value is determined to be a middle value contained in the range of cells.

12. The computer storage device of claim 10, wherein at least one of the first threshold type and second threshold type is a percent threshold type; and wherein at least one of the first dynamic threshold value and the second dynamic threshold value is determined to be a delta value between a minimum value in the range of cells and a maximum value in the range of cells.

13. The computer storage device of claim 10, wherein at least one of the first threshold type and second threshold type is a percentile value threshold type; and wherein at least one of the first dynamic threshold value and the second dynamic threshold value is determined to be a value selected from the range of cells that is a percentile of the values contained in the range of cells.

14. The computer storage device of claim 10, wherein at least one of the first threshold type and second threshold type is a function threshold type; and wherein at least one of the first dynamic threshold value and the second dynamic threshold value is determined based on a computation of a provided function that utilizes values from the range of cells.

15. The computer storage device of claim 10, wherein when the format style is the color style, the color applied to each of the cells in the range of cells is dynamically determined.

16. A system for determining dynamic threshold values for variable formatting a range of cells, the system comprising:
at least one processor;
a memory, communicatively coupled to the at least one processor and containing instructions that, when executed by the at least one processor, perform a method, the method comprising:
determining a range of cells;
determining a format style, wherein the format style is one of an icon set; data bars; or a color scale;
determining a first threshold type, wherein the first threshold type is one of a value; a percent; a percentile; a number; or a formula;
determining a second threshold type, wherein the second threshold type is one of a value; a percent; a percentile; a number; or a formula;
evaluating the content of all of the cells in the range of cells to determine a first dynamic threshold value that is within the range of cells based on the first threshold type and a first threshold point; and
evaluating the content of all of the cells in the range of cells to determine a second dynamic threshold value that is within the range of cells based on the second threshold type and a second threshold point;
evaluating the content of all the cells in the range of cells to determine a format value for each cell in the range of cells;
comparing the format value of each cell in the range of cells to the determined first dynamic threshold value and the determined second dynamic threshold value; and
applying the format style to each cell in the range of cells based on the comparison between the format value of each cell in the range of cells and the determined first dynamic threshold value and the determined second dynamic threshold value such that the format style of each cell in the range of cells varies according to the format value of the cell in relation to the determined first dynamic threshold value and the determined second dynamic threshold value.

17. The system of claim 16, wherein the first dynamic threshold value and the second dynamic threshold value are determined based on the selected threshold type and based on a comparison of the values within the range of cells.

18. The system of claim 16, wherein at least one of the first threshold type and second threshold type is a lowest value threshold type; and wherein at least one of the first dynamic threshold value and the second dynamic threshold value is determined to be a lowest value contained in the range of cells.

19. The system of claim 16, wherein at least one of the first threshold type and second threshold type is a highest value threshold type; and wherein at least one of the first dynamic threshold value and the second dynamic threshold value is determined to be a highest value contained in the range of cells.

20. The system of claim 16, wherein at least one of the first threshold type and second threshold type is a middle value threshold type; and wherein at least one of the first dynamic threshold value and the second dynamic threshold value is determined to be a middle value contained in the range of cells.

* * * * *